US010261518B2

(12) United States Patent
Miranda De Souza (10) Patent No.: US 10,261,518 B2
(45) Date of Patent: Apr. 16, 2019

(54) METHOD AND APPARATUS FOR PROTECTING AIRCRAFT MAXIMUM LIFT CAPABILITY

(71) Applicant: Embraer S.A., São José dos Campso-SP (BR)

(72) Inventor: Sérgio Luiz Miranda De Souza, São José dos Campos (BR)

(73) Assignee: Embraer S.A., São José dos Campos (BR)

( * ) Notice: Subject to any disclaimer, the term of this patent is extended or adjusted under 35 U.S.C. 154(b) by 91 days.

(21) Appl. No.: 14/939,465

(22) Filed: Nov. 12, 2015

(65) Prior Publication Data

US 2017/0139425 A1   May 18, 2017

(51) Int. Cl.
*B64D 43/02* (2006.01)
*G05D 1/08* (2006.01)
*B64C 13/18* (2006.01)
*B64C 13/50* (2006.01)
*G05D 1/00* (2006.01)

(52) U.S. Cl.
CPC ........... *G05D 1/0833* (2013.01); *B64C 13/18* (2013.01); *B64C 13/503* (2013.01); *B64D 43/02* (2013.01); *G05D 1/0066* (2013.01)

(58) Field of Classification Search
CPC .. G05D 1/0833; G05D 1/0066; B64C 13/503; B64C 13/18; B64D 43/02
See application file for complete search history.

(56) References Cited

U.S. PATENT DOCUMENTS

| | | | |
|---|---|---|---|
| 8,214,089 B2* | 7/2012 | Caldeira | G05D 1/0833 244/181 |
| 2006/0178790 A1* | 8/2006 | Shigemi | G01O 5/005 701/7 |
| 2016/0122000 A1* | 5/2016 | Mahmulyin | B64C 13/16 244/230 |

OTHER PUBLICATIONS

FAA, Density Altitude, 2008 (Year: 2008).*
Unknown, The Flight Control of the Eurofighter Typhoon, retrieved from wayback machine May 13, 2014 (Year: 2014).*

* cited by examiner

*Primary Examiner* — Alan D Hutchinson
(74) *Attorney, Agent, or Firm* — Nixon & Vanderhye P.C.

(57) ABSTRACT

An aircraft automatic control system protects structural parameters of an aircraft based on angle of attack protection by use of maximum allowed angle of attack values as a function of dynamic pressure or a combination of parameters that permit computation of dynamic pressure. Example techniques herein limit the wing lift coefficient as a function of dynamic pressure (or velocity) to create a limitation for the maximum lift produced by an aircraft wing.

20 Claims, 11 Drawing Sheets

Figure 1 - Typical load factor limitation as a function of aircraft weight.

Figure 2 - Schemes to implement the load factor limitation.

Figure 3 - Variation of load factor with airspeed, (a) Constant CL, (b) Limited CL.

Figure 4 - Typical variation of maximum lift coefficient with Mach number- cruise configuration.

Figure 5 - Typical variation of maximum lift coefficient with equivalent airspeed for different flight altitudes - cruise configuration.

Figure 6 - Aerodynamic and structural constraints for the lift produced by the wing.

Figure 7 - Implementation of the methodology based on a conventional stall protection.

Figure 7(a) – Actuation Regions of stall and Lmax protections.

Figure 8 - Results of maximum load factor vs. aircraft mass produced by the methodology.

Figure 9(a),(b) - Effects of angle of attack errors on CL estimations.

METHOD AND APPARATUS FOR PROTECTING AIRCRAFT MAXIMUM LIFT CAPABILITY

CROSS-REFERENCE TO RELATED APPLICATIONS

None.

STATEMENT REGARDING FEDERALLY SPONSORED RESEARCH OR DEVELOPMENT

None.

FIELD

The technology herein relates to a flight control protection methodology for an aircraft. More particularly, example techniques herein limit the wing lift coefficient as a function of dynamic pressure (or velocity) to create a limitation for the maximum lift produced by the wing.

BACKGROUND AND SUMMARY

Commonly-assigned U.S. Pat. No. 8,214,089 (incorporated herein by reference) discloses a flight control system that moves control surfaces such as elevators according to a pilot command summed with an automatic command. The flight control system monitors a set of flight parameters such as angle of attack (AOA) to determine if the flight vehicle is operating inside a permitted envelope. The flight control system incorporates automatic protections through automatic commands if the flight vehicle is close to its envelope limits.

While the techniques disclosed in that patent are highly useful, further improvements are possible and desirable.

BRIEF DESCRIPTION OF THE DRAWINGS

The following detailed description of exemplary non-limiting illustrative embodiments is to be read in conjunction with the drawings, of which:

FIG. 7A presents example actuation regions of stall and Lmax protections;

DETAILED DESCRIPTION OF EXAMPLE NON-LIMITING EMBODIMENTS

The example non-limiting methodology and apparatus modifies conventional angle of attack (AOA) envelope protection such as disclosed in U.S. Pat. No. 8,214,089 to perform additional structural protection, such as to protect maximum lift.

The example non-limiting embodiments build the AOA_max tables as a function of a set of parameters that comprehend dynamic pressure. The dynamic pressure can be calculated by using different combinations of parameters, for example: Qdyn (dynamic pressure), KCAS (calibrated airspeed in knots), KEAS (effective air speed in knots), Mach and Altitude.

Figure 1:
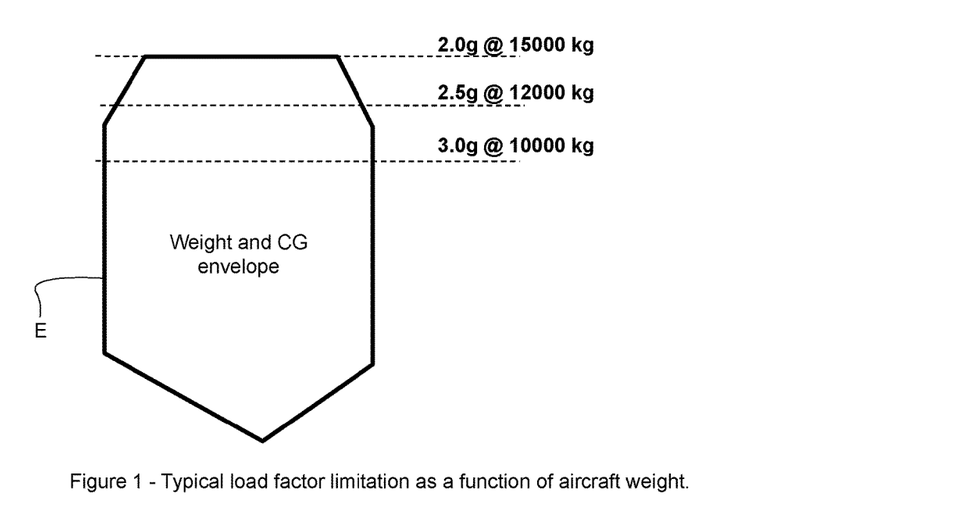
FIG. 1 presents an example non-limiting typical load factor limitation as a function of aircraft weight.

In the definition of the operational envelope of cargo aircraft, it is common to limit the maximum load factor as a function of the aircraft weight in order to optimize the aircraft performance for different mission objectives. FIG. 1 illustrates schematically a hypothetical aircraft weight and center of gravity (cg) envelope defined associated with aircraft maximum load factor capability. Generally, limiting the load factor as a function of the mass, is intended to handle the selection between aircraft maneuverability and load capability, always observing the aircraft structural limitations. Commonly this condition is obtained when a given amount of lift produced by the wing is not exceeded. That is, the product mass x load factor remains constant as exemplified in FIG. 1.

Figure 2:
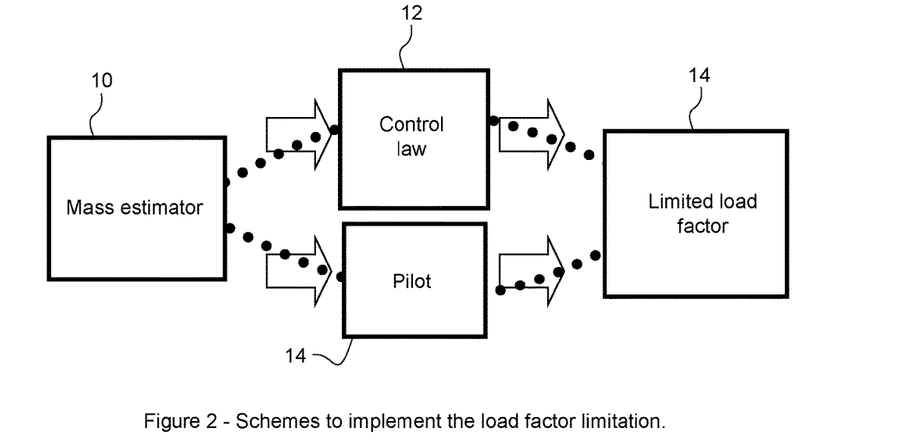
FIG. 2 presents example non-limiting schemes to implement the load factor limitation.

The usual process to limit the load factor is based on the use of mass estimators. As shown in FIG. 2, the mass estimator (10) can be used in at least two ways:

1. Fly-By-Wire (FBW) aircraft (closed loop): The flight control computer implements a control law (12) that limits the maximum load factor available based on the mass.

2. Conventional aircraft (open loop): The system informs the pilot (13) of the allowable load factor. The pilot is then responsible for maneuvering the aircraft without exceeding the informed limits.

Both approaches result in a limited load factor 14 so the aircraft always operates within the load factor limitation the weight and CG envelope E (FIG. 1) defines.

However, the particular scheme shown in FIG. 2 using mass estimation heavily depends on the accuracy of the mass estimator 10 used.

In the prior art, it is known to calculate the mass by estimating the lift coefficient CL (that is interpolated using an aerodynamic database of the aircraft), based on flight conditions according to equations 1 and 2 below:

$$CL = f(\text{alpha, flap, Mach, elevator, Stabilizer position}) \quad \text{(equation 1)}$$

$$\text{Estimated mass} = Qdyn * S * CL / (nz * g) \quad \text{(equation 2)}$$

Where:
Qdyn=Dynamic pressure

S=Aircraft reference wing area
nz=aircraft longitudinal load factor
g=gravity.

A problem of the estimation process can result from uncertainty in the aerodynamic database and imprecision of angle of attack measurements. Mass estimators 10 used in civil aircrafts can present perceptual errors on the order of 10%. When applying this technology to cargo planes, the scheme becomes more complex when needed to cover sensitive missions such as a cargo drops or firefighting.

It would be desirable to overcome difficulties in estimating aircraft mass by providing an alternative method for developing a load limiting factor such as shown in FIG. 1 that does not depend on mass estimators. However, a precise weight estimation process is costly and complex. Thus, a simple implementation may not reach the precision levels necessary to provide adequate structural protection.

The example non-limiting technology herein presents functionality that limits the maximum lift force that can be produced by the aircraft. This functionality limits the maximum load factor achieved by the aircraft as a function of weight (without the need to estimate it) respecting the maximum lift force that designs the wing structure. The functionality also allows other features to reduce the loads more effectively, since the controlled parameter represents more faithfully the phenomena that design the structures.

The present methodology is applicable for example in cases where the structural limitation is mainly governed by the maximum lift force produced by an aircraft wing. Example non-limiting methods and apparatus herein limit the wing lift coefficient as a function of dynamic pressure (or velocity) to create a limitation for the maximum lift produced by the wing.

Figure 3:
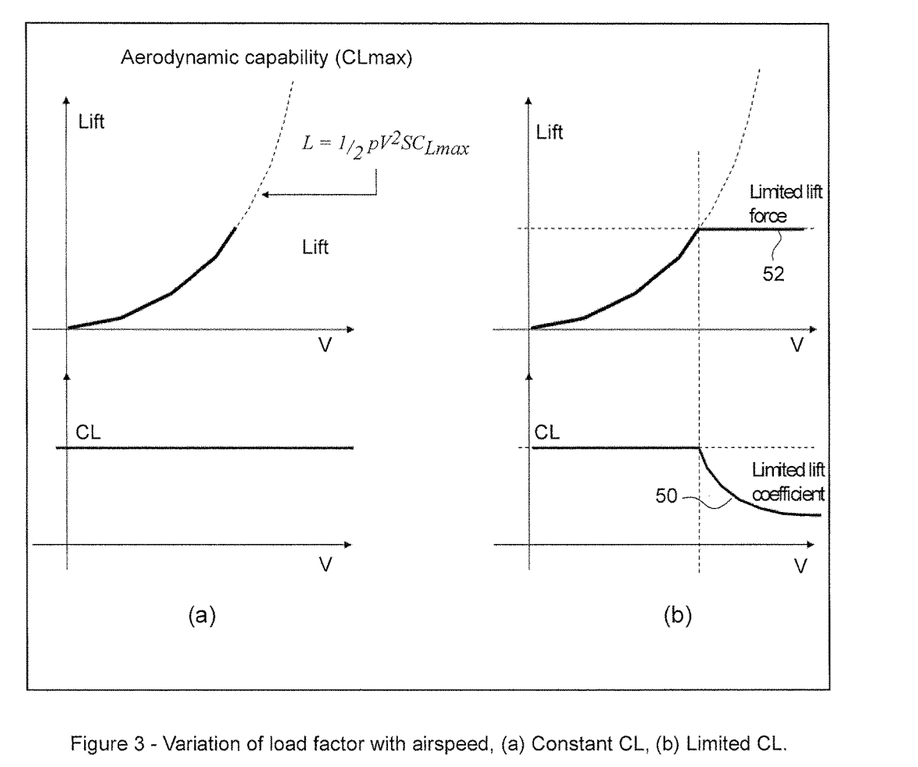
FIGS. 3(a) and 3(b) present example variations of load factor with airspeed and lift coefficient.

FIG. 3 shows, for a given mass, example variation of the load factor as a function of airspeed (or dynamic pressure). The plot of FIG. 3 (a) shows that for a constant wing lift coefficient, the lift force (and consecutively the load factor) varies quadratically with airspeed. Plot 3(b) demonstrates that it is possible to generate a CL limitation (note feature 50) as to limit the maximum lift generated by the wing (note feature 52) to a predetermined value.

Figure 4:
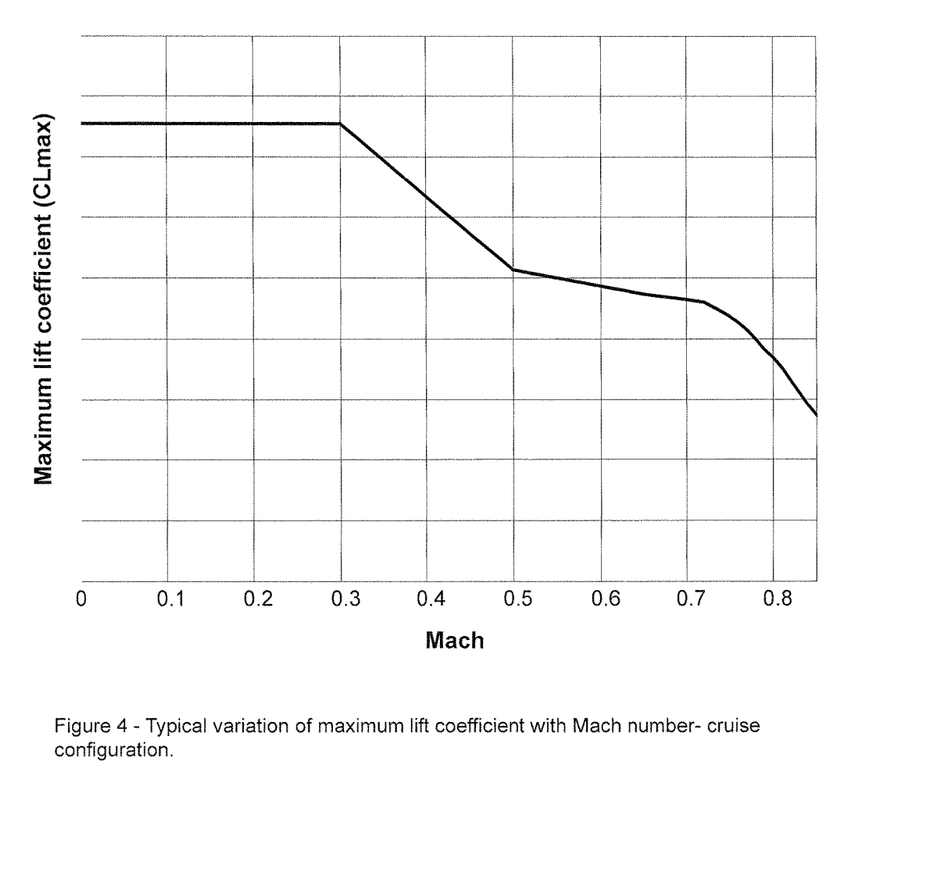
FIG. 4 presents a typical variation of maximum lift coefficient with Mach number for an aircraft in cruise configuration.

FIG. 4 shows a typical variation of maximum lift coefficient of a wing in cruise configuration as a function of Mach number (a dimensionless quantity representing the ratio of flow velocity past a boundary to the local speed of sound). As Mach number increases, the maximum lift coefficient remains constant until inside the subsonic regime (essentially Mach numbers lower than 0.3) and then begins to decrease with increase of the Mach number.

Figure 5:
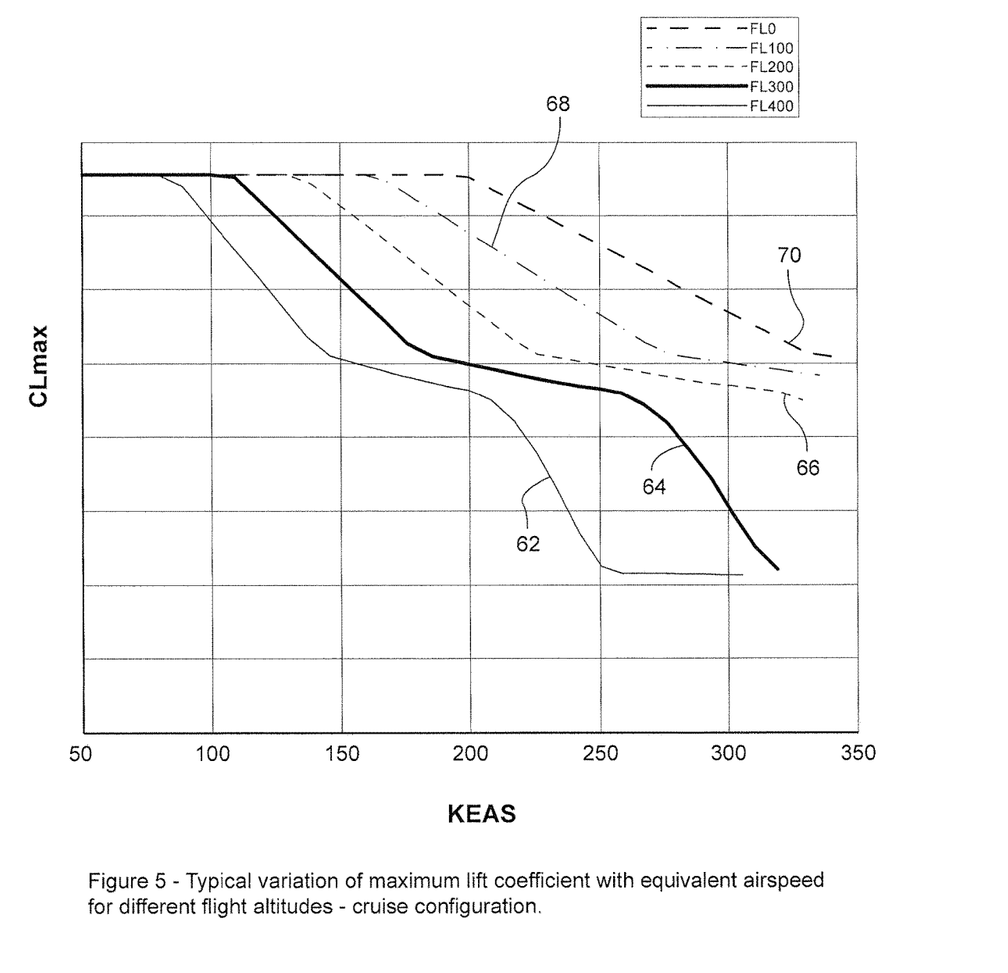
FIG. 5 presents a typical variation of maximum lift coefficient with equivalent airspeed for an aircraft in cruise configuration for different flight altitudes.

The Mach effect on maximum lift coefficient also can be observed on FIG. 5 that shows the same data of the curve shown in FIG. 4, while plotting the CL as a function equivalent airspeed for various altitudes. In FIG. 5, the horizontal axis represents airspeed (equivalent airspeed in knots, or "KEAS"). In the example shown, plotted airspeed varies from 50 knots to 350 knots. The different CL curves represent different flight levels (FL), i.e., a specific barometric pressure expressed as nominal altitude in hundreds of feet. Thus, curve 70 represents an FL=10, curve 68 represents FL=100, curve 66 represents FL=200, curve 64 represents FL=300, and curve 62 represents FL=400. As can be seen from this plot, the maximum lift coefficient CL decreases as airspeed increases and also decreases as air pressure decreases.

In a conventional angle of attack protection, the reference maximum values allowed by the control law are calculated based on aircraft configuration (such as flap/slat deflections, landing gear position . . . ) and a set of parameters related to flight condition (such as Mach number, ice condition . . . ). Both configuration and flight condition parameters are selected based on relevance to the aerodynamic stall phenomena.

In one example non-limiting embodiment, the lift coefficient limitation can be implemented through angle of attack protection where the reference maximum values used by the functionality are additionally limited by a parameter related to the dynamic pressure, such as equivalent airspeed, calibrated airspeed, dynamic pressure and other combinations.

Generally, the disclosed protection system embodiment can be implemented to limit other load parameters relevant to the structural design, such as wing lift and wing bending moment. Additionally, other relevant parameters such as wing fuel weight can be used to improve system performance. The wing fuel weight is particularly relevant if the wing bending moment is the parameter to be limited.

Figure 6:
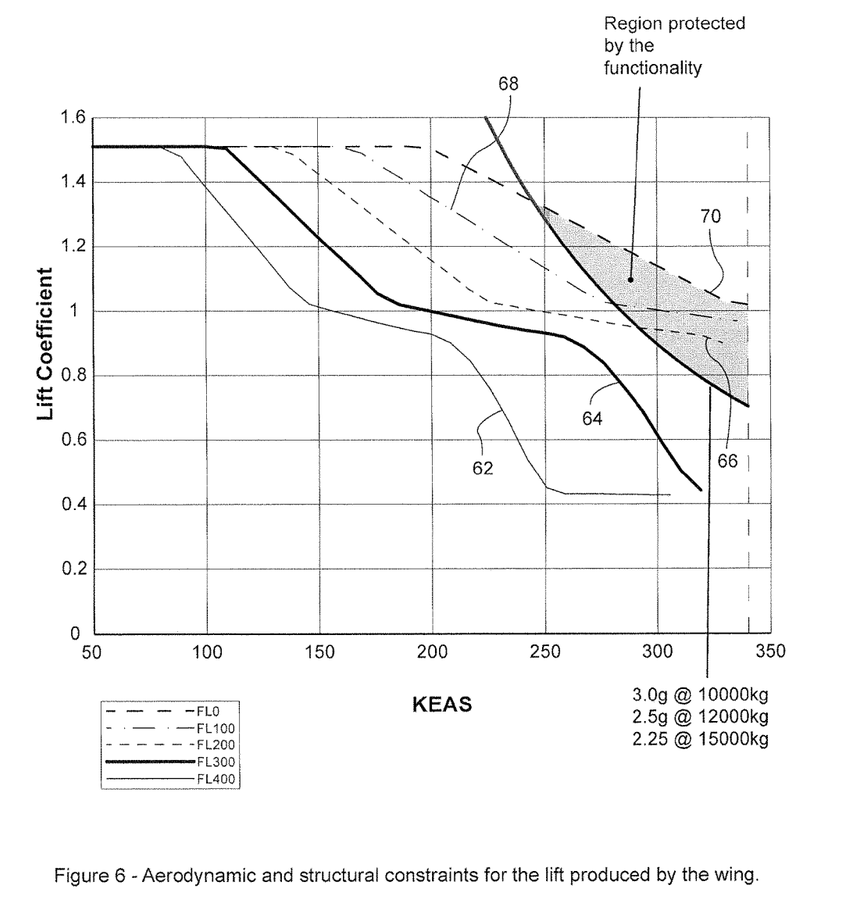
FIG. 6 presents an example plot with aerodynamic and structural constraints for the lift produced by a wing.

FIG. 6 overlays on top of the FIG. 5 curves an additional region to be lift-protected based on aerodynamic (stall) and structural constraints for the lift produced by an example wing. The maximum angle of attack value used in the angle of attack protection control law should be the smaller of the two limitations. In other words, the automatic control system of the example non-limiting implementations can control angle of attack to be the smaller of the value needed to protect angle of attack and the value needed to protect maximum lift The structure of one example non-limiting implementation of the methodology is similar to a stall protection. A difference consists in using any combination of parameters that permits calculation of the dynamic pressure of the flight condition in order to protect maximum lift (Lmax).

Figure 7:
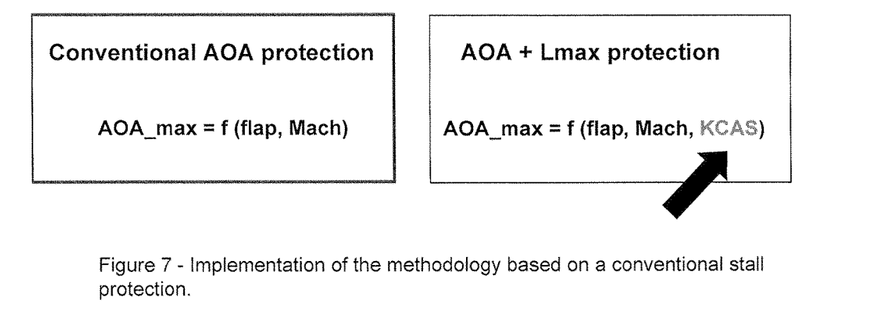
FIG. 7(a) presents example actuation regions of stall and Lmax protections.

FIG. 7 presents an example where the Lmax protection is implemented by adding calibrated airspeed to the Angle of Attack (AOA) maximum tables. As shown in FIG. 7, the typical conventional AOA protection is based on a function of aircraft configuration (such as flap/slat deflections, landing gear position . . . ) and a set of parameters related to flight condition (such as Mach number, ice condition . . . ). In the example shown, an additional factor KCAS (calibrated airspeed in knots) is introduced in order to provide maximum lift protection. By implementing the limitation of angle of attack as a function of equivalent airspeed in the control law, it is possible to achieve the results shown in FIGS. 7A and 8.

Figure 7A:
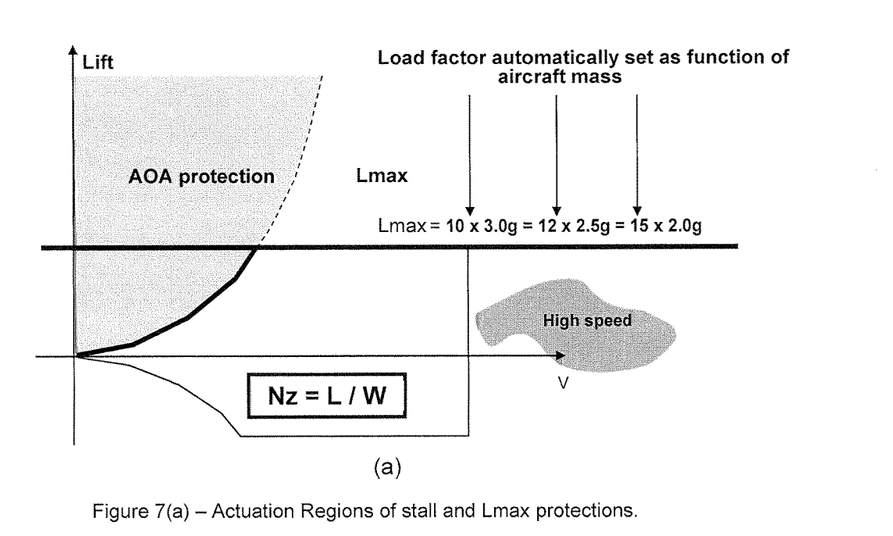
Figure 8:
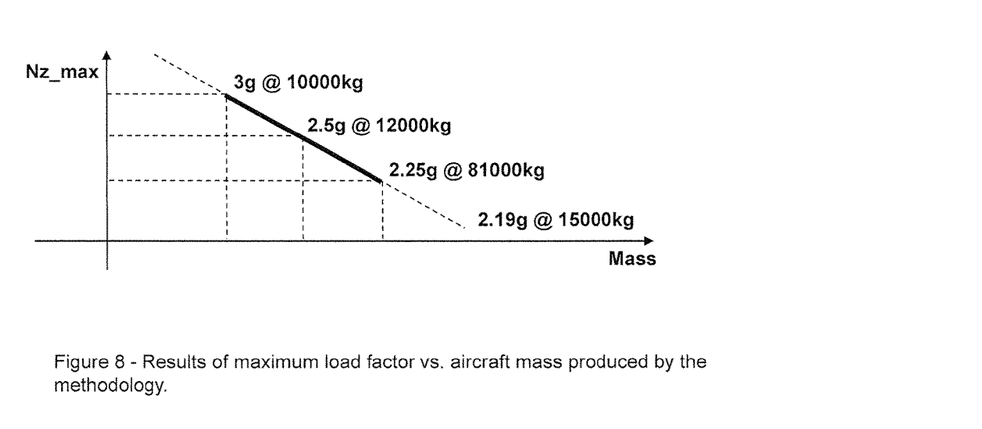
FIG. 8 presents example results of maximum load factor vs. aircraft mass produced by the methodology.

In more detail, FIG. 7A shows example actuation regions of stall and Lmax protection based on enhanced AOA protection that takes maximum lift into account. In this example, Lmax is defined, and the maximum load factor Nz is automatically set as a function of aircraft mass (i.e., the equation Nz=L/W is implemented). FIG. 8 shows example results of maximum load factor Nz vs. aircraft mass (in kilograms).

The example non-limiting embodiments thus use a mass estimator that can estimate CL under different flight conditions. Because of this, the mass estimator is exposed to aerodynamic database errors in all these conditions. The Lmax protection thus depends on the accuracy of the database in a smaller envelope and can be calibrated with flight test data. Example: Building the alpha (AOA) vs KEAS (equivalent airspeed) boundary by making windup turns thereby sweeping speeds of interest for three different altitudes.

Figure 9A:
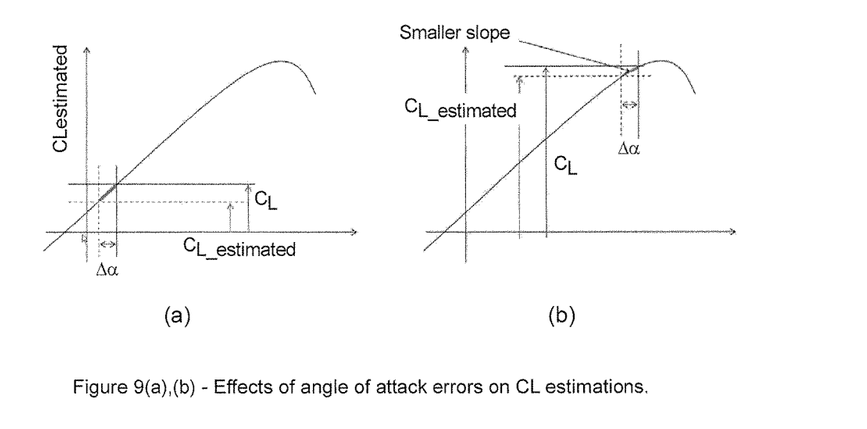
FIG. 9(a), (b) presents the effects of angle of attack errors on CL estimations.

In some example non-limiting embodiments, Lmax protection is subject to errors in alpha readings at high alpha conditions where the relative error becomes lower. Additionally, the lift curve slope usually decreases at high angle of attack; this is reduced which also contributes to decreased effect of errors in the alpha readings. The weight estimator process needs to deal with conditions where the angle of attack is small, which makes the alpha sensor readings relatively greater. These effects can be seen for example in FIG. 9, which shows how increased angle of attack can decrease the slope of the maximum lift curve for a given Δα (change in angle of attack).

Example Non-Limiting Implementation

Figure 10:
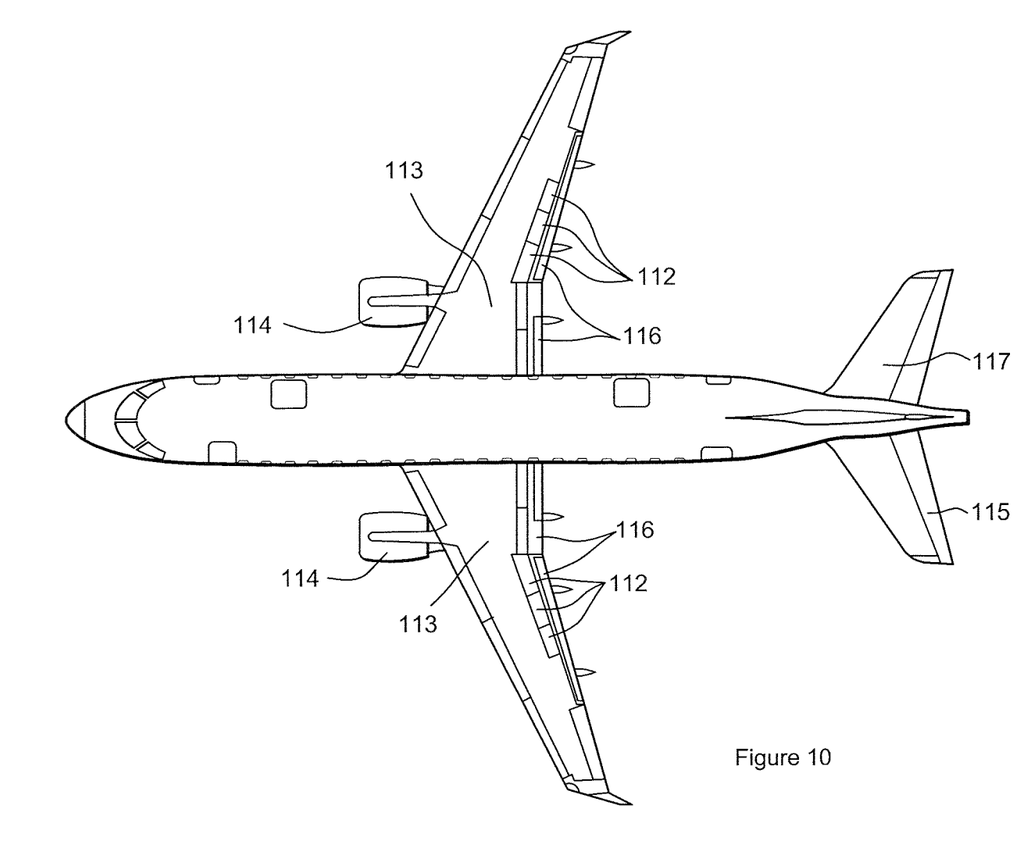
FIG. 10 is an example flight vehicle.

The exemplary illustrative non-limiting implementations herein relate to systems, apparatuses and methods to be used in a flight vehicle equipped with pitch control, such as elevators and a pilot inceptor such as a side-stick or a column yoke. FIG. 10 shows an exemplary illustrative aircraft. The plane has a set of wings 113, provided with engines 114, and wing spoilers 112 and flaps 116 which control wing lift. The spoilers 112 help change lift, drag and roll of the wing, and the flaps 116 help change lift and drag of the wing. The tail of the plane is also equipped with a horizontal stabilizer 117 provided with an elevator 115 which controls pitch orientation of the aircraft in flight.

Figure 11:
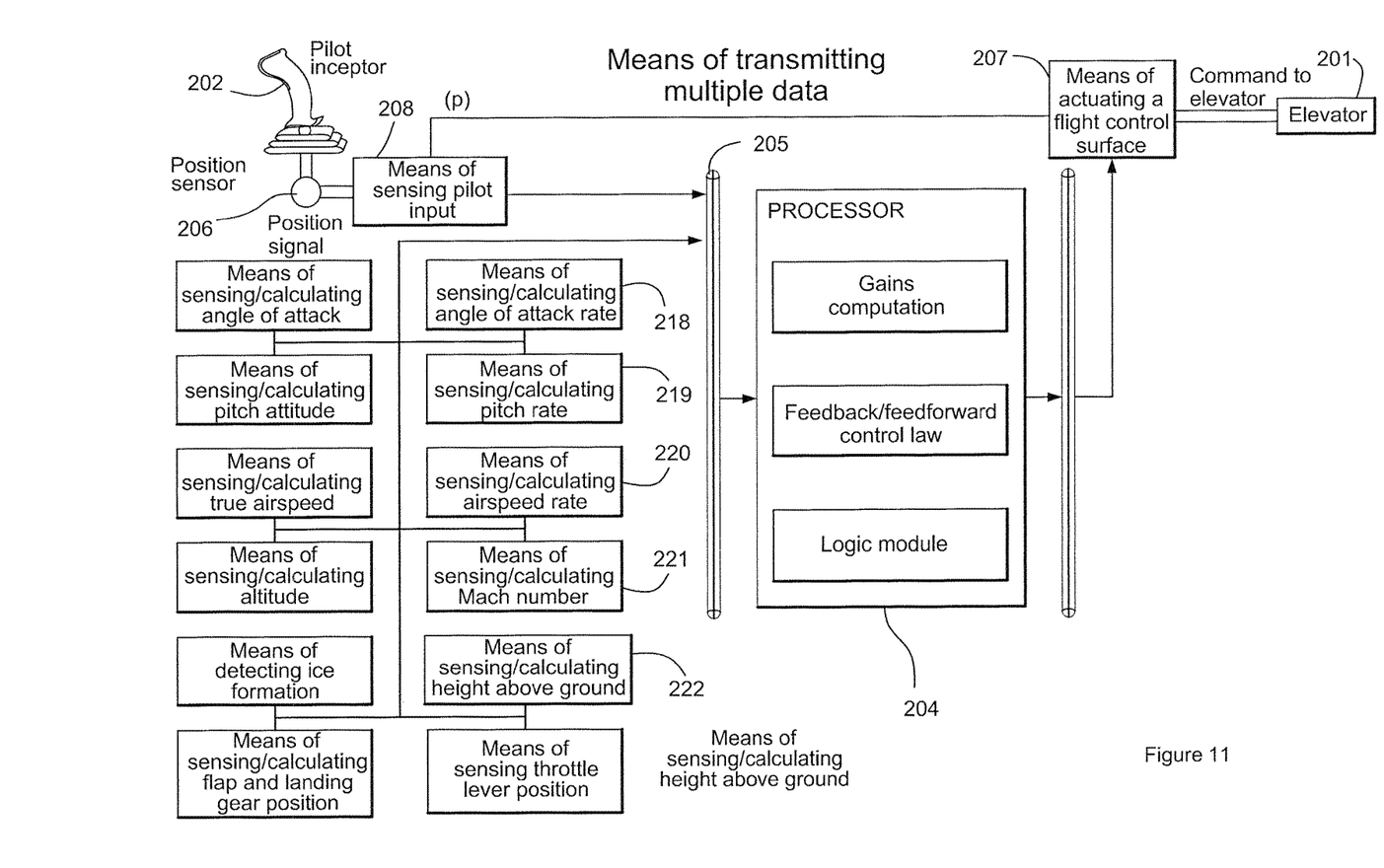
FIG. 11 is a schematic diagram of an exemplary illustrative non-limiting flight control system, showing the basic architecture of the system.

An exemplary illustrative non-limiting flight control system is shown in FIG. 11. This exemplary flight control system receives input position signals from the pilot inceptor 202 command (p). The term "pilot inceptor" includes a plurality of devices used in aeronautics industry to allow the interface with the human pilot, e.g., columns, mini-columns, sticks, side-sticks and all others.

Further, the exemplary illustrative non-limiting system receives signals from sensors 218, 219, 220, 221, 222. In this exemplary implementation, the sensors provide: angle-of-attack ($\alpha$), angle-of-attack rate ($\dot{\alpha}$) airspeed (u), airspeed rate ($\dot{u}$), the flap position ($\delta_F$), gear position ($\delta_G$), pitch attitude ($\theta$), pitch rate (q), height above ground ($h_{AGL}$) ice detection bit ($b_{Ice}$), engine throttle lever position ($\delta_{TLA}$), Mach number (Mach) and altitude (h). Other sensors are also possible. For example, it is possible to measure barometric air pressure using a pitot tube or other sensor to determine dynamic air pressure as discussed above.

According to this exemplary implementation, the information flows via a means of transmitting multiple data such as a bus 205. All the data, i.e. pilot commands and sensors, is sent to a processor 204 that is operable to compute output based, for example, on a programmable code. The processor 204 is able, for example, to compute an elevator command based on the input data received.

This command is sent to a mechanism to actuate a flight control surface 207 to control or limit lift. Resultantly, the control surfaces are deployed according to the command computed by the processor 204.

Figure 12:
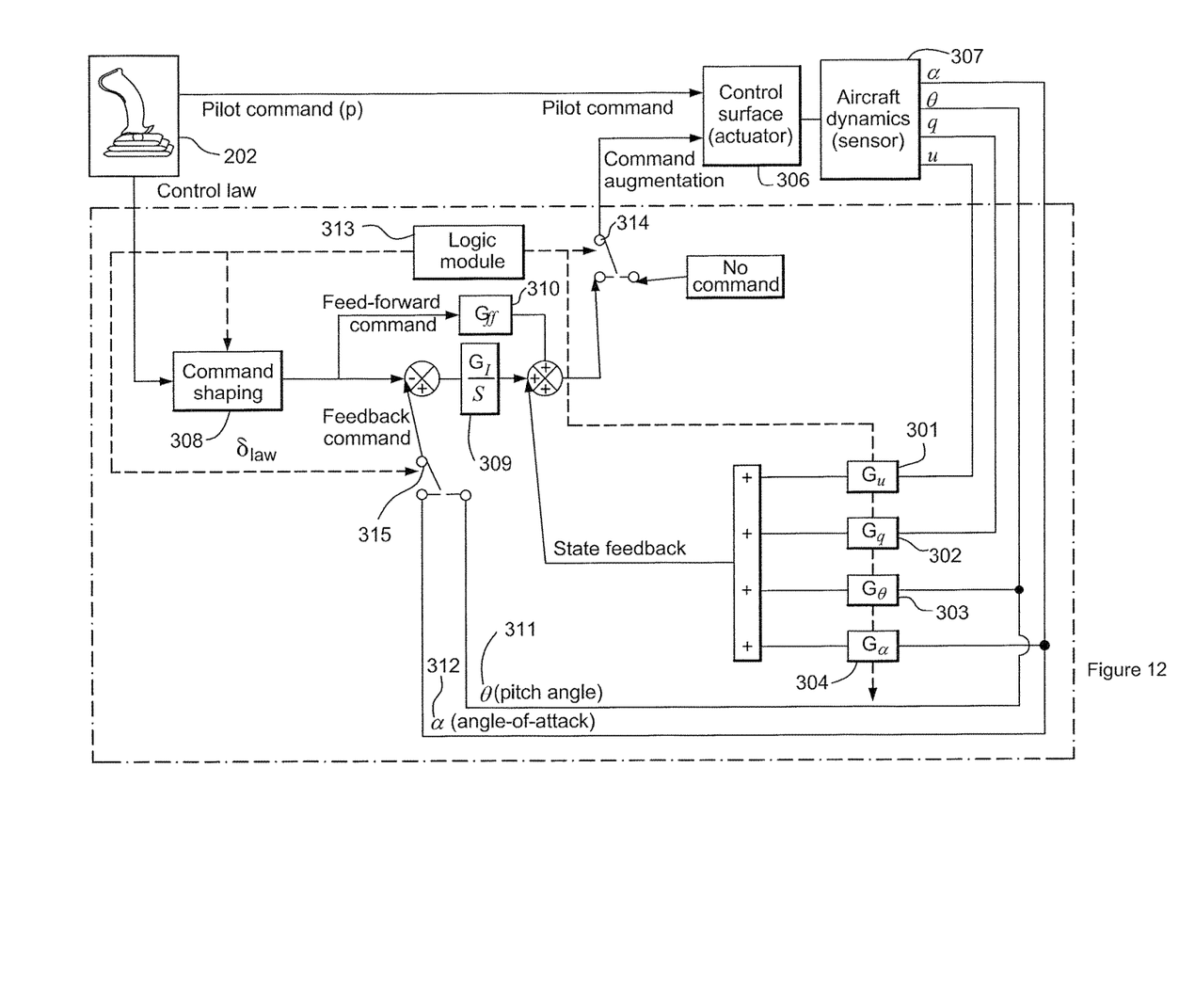
FIG. 12 presents a schematic of the exemplary illustrative non-limiting software that processes the function of the exemplary flight control system, showing how the pilot command is transformed into an elevator command depending on a logic module to enable it.

FIG. 12 shows main units of exemplary illustrative non-limiting software that may process the function in a flight control system. The pilot command block 305 represents the position of the pilot inceptor which is sent directly to the control surface that controls lift. As discussed above, the control law in the example non-limiting implementation limits the wing lift coefficient as a function of dynamic pressure (or velocity) to create a limitation for the maximum lift produced by the wing.

In the exemplary illustrative non-limiting implementation, a pilot inceptor command is transformed into an alpha ($\alpha$) command and/or pitch angle ($\theta$) command when protections are active. The relation between the variable to be controlled ($\alpha$ or $\theta$) and pilot command is depicted as command shaping 308. The output of the command shaping ($\delta_{law}$) is used as a reference to manipulate the elevators to track the variables $\alpha$ or $\theta$. When the pilot moves the inceptor to the stop (i.e., the mechanical limit of the inceptor), command shaping produces a maximum $\alpha$ or $\theta$ in order to preclude the airplane from exceeding the maximum allowed $\alpha$ or $\theta$ for the current airplane configuration.

The control law is calculated using the pitch states of the aircraft dynamic 307 which are fed back to the closed loop control law. Airspeed (u), pitch rate (q), pitch angle ($\theta$) and angle of attack ($\alpha$) are multiplied by the gains listed as 301, 302, 303, 304, respectively. The feed-forward command is produced based on the feed-forward gain 309 multiplied by the reference generated by the command shaping output 308.

The error (e) is calculated as the result of the difference between the reference and the angle-of-attack or pitch angle. The angle-of-attack is used when the stall, low speed and/or buffeting protections are engaged. The pitch angle ($\theta$) is used when the high attitude protection is engaged. The integral of the error (e) is multiplied by the integral gain in order to produce the integral command.

The gains values depend upon which protection is active. For example, when the low speed protection is active, the pitch angle gain 303 and true airspeed gain 301 are increased when compared to the pitch angle gain 303 and true airspeed gain 301 used in the stall protection function. Also, the gains are scheduled according to the Mach number and altitude the airplane is flying at the moment the protection is engaged.

Figure 13:
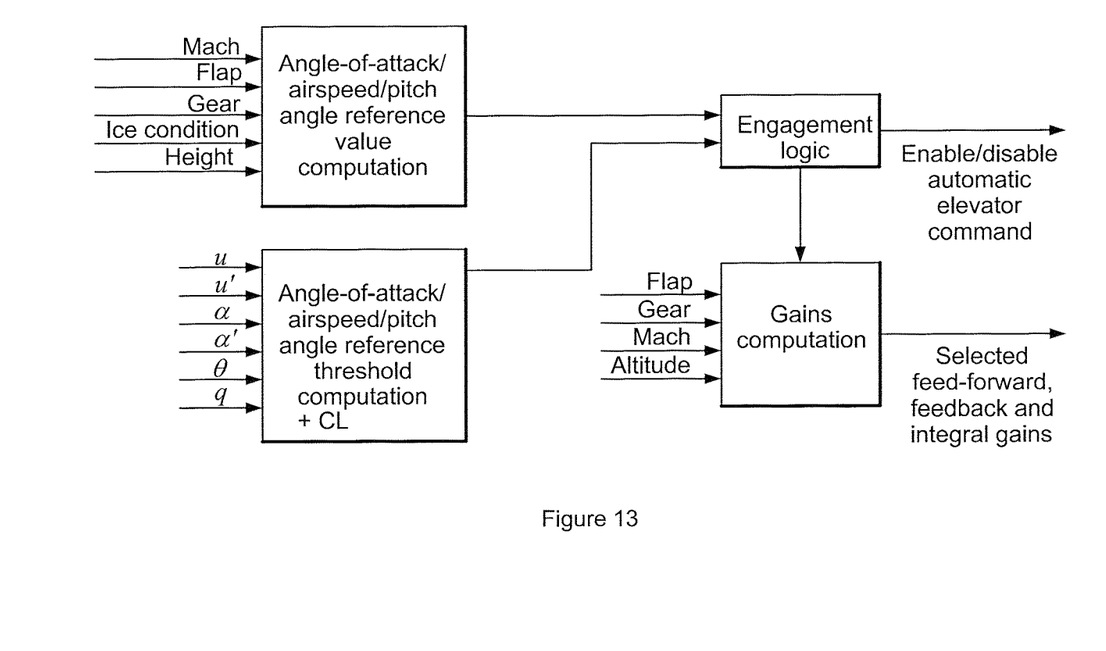
FIG. 13 is a diagram that details the exemplary illustrative non-limiting logic module.

FIG. 13 comprises data processing according to one exemplary illustrative implementation to allow the proper engagement and gain switching of the exemplary flight control system mode, according to flight conditions.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. An automatic flight protection system comprising:
   at least one sensor configured to allow determining or deriving of aircraft dynamic pressure;
   a processor operatively coupled to the at least one sensor, the processor being configured to determine or derive aircraft dynamic pressure and to limit a wing lift coefficient as a function of the aircraft dynamic pressure to create a limitation for a load parameter relevant to a structural design of an aircraft;
   the processor being further configured to determine angle of attack control dependent on the aircraft dynamic pressure or a combination of parameters that permit the computation of the aircraft dynamic pressure; and
   at least one electromechanical linkage coupled to the processor, the at least one electromechanical linkage controlling the aircraft in accordance with (a) the determined angle of attack control and (b) the limitation for the load parameter relevant to the structural design of the aircraft.

2. The system of claim 1 wherein the load parameter relevant to the structural design is a maximum lift produced by an aircraft wing.

3. The system of claim 1 wherein the load parameter relevant to the structural design is the maximum bending moment produced by an aircraft wing.

4. The system of claim 1 wherein the processor limits the load parameter relevant to the structural design based on equivalent airspeed.

5. The system of claim 1 wherein the processor limits the load parameter relevant to the structural design based on calibrated airspeed.

6. The system of claim 1 wherein the processor limits the load parameter relevant to the structural design based on wing fuel weight.

7. The system of claim 1 wherein the processor limits the load parameter relevant to the structural design based on Mach number and pressure altitude.

8. The system of claim 1 wherein the processor limits the load parameter relevant to the structural design based on altitude.

9. The system of claim 1 wherein the processor enforces a protection region based on a wing lift coefficient and airspeed.

10. The system of claim 1 wherein the processor enforces maximum lift protection based on load factor automatically set as a function of aircraft mass.

11. The system of claim 1 wherein the processor is configured to decrease sensitivity to angle of attack errors.

12. The system of claim 1 wherein the processor stores angle of attack control tables that are also dependent on dynamic pressure or a combination of parameters that permit the computation of the dynamic pressure.

13. An aircraft controlled based on an angle of attack protection, comprising:
   a fuselage having wings and at least one control surface actuated by at least one actuator;
   at least one sensor; and
   an automatic control system operatively coupled to the at least one sensor and the at least one control surface, the automatic control system determining dynamic pressure or a combination of parameters that permit computation of the dynamic pressure at least in part in response to the sensor, the automatic control system computing maximum allowed angle of attack values as a function of dynamic pressure or a combination of parameters that permit computation of the dynamic pressure to thereby limit a wing lift coefficient as a function of the aircraft dynamic pressure and create a limitation for a load parameter relevant to a structural design of the aircraft, and to use said computed maximum allowed angle of attack values to control the at least one actuator that actuates the control surface of the aircraft.

14. An automatic flight protection method for an aircraft comprising:
   determining or deriving aircraft dynamic pressure;
   using a processor to automatically limit wing lift coefficient as a function of the determined or derived aircraft dynamic pressure to create a limitation for a load parameter relevant to a structural design of the aircraft; and
   the processor exerting automatic electromechanical control of at least one control surface of the aircraft in accordance with the load parameter limitation.

15. The system of claim 14 wherein the load parameter relevant to the structural design is selected from the group consisting of (a) the maximum lift produced by an aircraft wing, and (b) the maximum bending moment produced by an aircraft wing, and is limited based on at least one of (c) equivalent airspeed, (d) calibrated airspeed, (e) wing fuel weight, (f) Mach number, and (g) pressure altitude.

16. The method of claim 14 further including the processor enforcing a protection region based on a lift coefficient and airspeed.

17. The method of claim 14 further including the processor enforcing maximum lift protection based on load factor automatically set as a function of aircraft mass.

18. The method of claim 14 further including the processor decreasing sensitivity to angle of attack errors.

19. The method of claim 14 further including the processor storing angle of attack control tables that are also dependent on dynamic pressure or a combination of parameters that permit the computation of the dynamic pressure.

20. The method of claim 14 wherein the processor uses maximum allowed angle of attack values as a function of dynamic pressure or a combination of parameters that permit computation of the dynamic pressure.

* * * * *